US012601384B2

(12) United States Patent
    Hasegawa

(10) Patent No.: US 12,601,384 B2
(45) Date of Patent: Apr. 14, 2026

(54) FLUID PRESSURE DAMPER

(71) Applicant: KYB Corporation, Tokyo (JP)

(72) Inventor: Kazuki Hasegawa, Gifu (JP)

(73) Assignee: KYB CORPORATION, Tokyo (JP)

( * ) Notice: Subject to any disclaimer, the term of this patent is extended or adjusted under 35 U.S.C. 154(b) by 443 days.

(21) Appl. No.: 18/551,359

(22) PCT Filed: Mar. 15, 2022

(86) PCT No.: PCT/JP2022/011528
    § 371 (c)(1),
    (2) Date: Sep. 19, 2023

(87) PCT Pub. No.: WO2022/202474
    PCT Pub. Date: Sep. 29, 2022

(65) Prior Publication Data
    US 2024/0167532 A1     May 23, 2024

(30) Foreign Application Priority Data

Mar. 23, 2021    (JP) ................................. 2021-049216

(51) Int. Cl.
    *F16F 9/46*       (2006.01)
    *F16F 9/19*       (2006.01)
    *B60G 17/08*      (2006.01)
(52) U.S. Cl.
    CPC ................ *F16F 9/465* (2013.01); *F16F 9/19* (2013.01); *B60G 17/08* (2013.01); *B60G 2202/24* (2013.01); *B60G 2204/62* (2013.01); *B60G 2206/41* (2013.01); *B60G 2500/114* (2013.01); *B60G 2600/21* (2013.01); *B60G*

*2800/162* (2013.01); *B60G 2800/916* (2013.01); *F16F 2222/12* (2013.01); *F16F 2228/066* (2013.01)

(58) Field of Classification Search
    CPC ........ F16F 9/19; F16F 9/465; F16F 2228/066; B60G 17/08; B60G 2206/41; B60G 2500/114; B60G 2600/21; B60G 2800/162; B60G 2800/916
    USPC ................. 188/266.2, 266.5, 318; 280/5.507
    See application file for complete search history.

(56) References Cited

U.S. PATENT DOCUMENTS 6,079,526 A * 6/2000 Nezu ......................... F16F 9/46
                                                    188/266.6
7,654,369 B2 2/2010 Murray et al.
                        (Continued)

FOREIGN PATENT DOCUMENTS

JP         2015-206374 A      11/2015

*Primary Examiner* — Christopher P Schwartz
(74) *Attorney, Agent, or Firm* — Rabin & Berdo, P.C

(57) ABSTRACT
A damping unit of a shock absorber has: a damping valve provided in a second fluid passage, the damping valve being configured to impart variable resistance to a flow of working oil passing therethrough depending on positions; a bypass passage connected to the second fluid passage so as to bypass the damping valve; a solenoid valve configured to control the flow of the working oil in the bypass passage guided to the damping valve as a pilot pressure for switching the positions of the damping valve; a bottom-side restrictor portion configured to impart resistance to the flow of the working oil guided from the second fluid passage to the solenoid valve; and a rod-side relief valve configured to release the pressure in the bypass passage to a rod side chamber through the second fluid passage.

5 Claims, 3 Drawing Sheets

(56)           References Cited

U.S. PATENT DOCUMENTS

| | | | |
|---|---|---|---|
| 8,651,251 B2 * | 2/2014 | Preukschat | B60G 17/056 |
| | | | 188/282.4 |
| 11,084,350 B2 * | 8/2021 | Birch | B60G 15/06 |
| 11,285,775 B2 * | 3/2022 | Bergfeld | F16F 9/19 |
| 2009/0288924 A1 | 11/2009 | Murray et al. | |
| 2017/0016505 A1 | 1/2017 | Funato | |

* cited by examiner

FLUID PRESSURE DAMPER

TECHNICAL FIELD

The present invention relates to a fluid pressure dumper.

BACKGROUND ART

JP2015-206374A discloses a fluid pressure dumper including a piston rod that is inserted into a cylinder so as to be freely movable back and forth, and the piston rod has a rod portion that extends outside the cylinder and a piston that is connected to an end portion of the rod portion and freely slidably moves within the cylinder. In this cylinder device, the rod portion has: a rod inner space that is formed in the rod portion and communicates with a piston side chamber of the cylinder; a first communicating passage that connects the rod inner space and a rod side chamber of the cylinder; and an orifice plug that is provided in the first communicating passage in a changeable manner. A damping force is generated as resistance is imparted by the orifice plug to working fluid flowing between the piston side chamber and the rod side chamber.

SUMMARY OF INVENTION

With the fluid pressure dumper described in JP2015-206374A, the damping force generated can be adjusted by changing the orifice plug for generating the damping force.

On the other hand, with the fluid pressure dumper, there is a demand for adjusting damping characteristic without performing an operation such as changing of parts. In order to achieve this, for example, it is conceivable to configure the fluid pressure dumper such that a part of the working fluid flowing between a first pressure chamber and a second pressure chamber is guided as a pilot pressure to a damping valve having different damping characteristics depending on positions, and to control a supply of the pilot pressure by a solenoid valve. With such a configuration, because the position of the damping valve can be switched by controlling operation of the solenoid valve, it is possible to perform adjustment of the damping characteristics without performing the operation such as the changing of the parts. In such a case, it is required to protect the solenoid valve from the working fluid having a high pressure that is guided between the first pressure chamber and the second pressure chamber of the fluid pressure dumper.

An object of the present invention is to provide a fluid pressure dumper capable of adjusting damping characteristics while protecting a solenoid valve of a damping unit.

According to one aspect of the present invention, a fluid pressure dumper comprising: a cylinder tube; a piston rod inserted into the cylinder tube so as to be freely movable into and out of the cylinder tube; a piston connected to the piston rod, the piston being configured to partition an interior of the cylinder tube into a first pressure chamber and a second pressure chamber; and a damping unit configured to generate damping force by imparting resistance to a flow of working fluid between the first pressure chamber and the second pressure chamber, wherein the damping unit has: a fluid passage configured to guide the working fluid flowing from the first pressure chamber towards the second pressure chamber; a damping valve provided in the fluid passage, the damping valve being configured to impart variable resistance to the flow of the working fluid passing therethrough depending on positions; a bypass passage connected to the fluid passage so as to bypass the damping valve; a solenoid valve provided in the bypass passage, the solenoid valve being configured to guide a part of the working fluid in the bypass passage to the damping valve as a pilot pressure; a first restrictor portion configured to impart resistance to the flow of the working fluid guided to the solenoid valve from the first pressure chamber through the bypass passage; and a first relief valve configured to open when a pressure in the bypass passage reaches a predetermined relief pressure to release the pressure in the bypass passage to the second pressure chamber through the fluid passage.

DESCRIPTION OF EMBODIMENTS

In the following, a fluid pressure dumper according to respective embodiments of the present invention will be described with reference to the drawings. In the following, a case in which the fluid pressure dumper is a shock absorber 100 that is installed on a vehicle will be described.

The shock absorber 100 is device that suppresses vibration of a vehicle body by, for example, being interposed between the vehicle body and an axle shaft of the vehicle and by generating a damping force.

Figure 1:
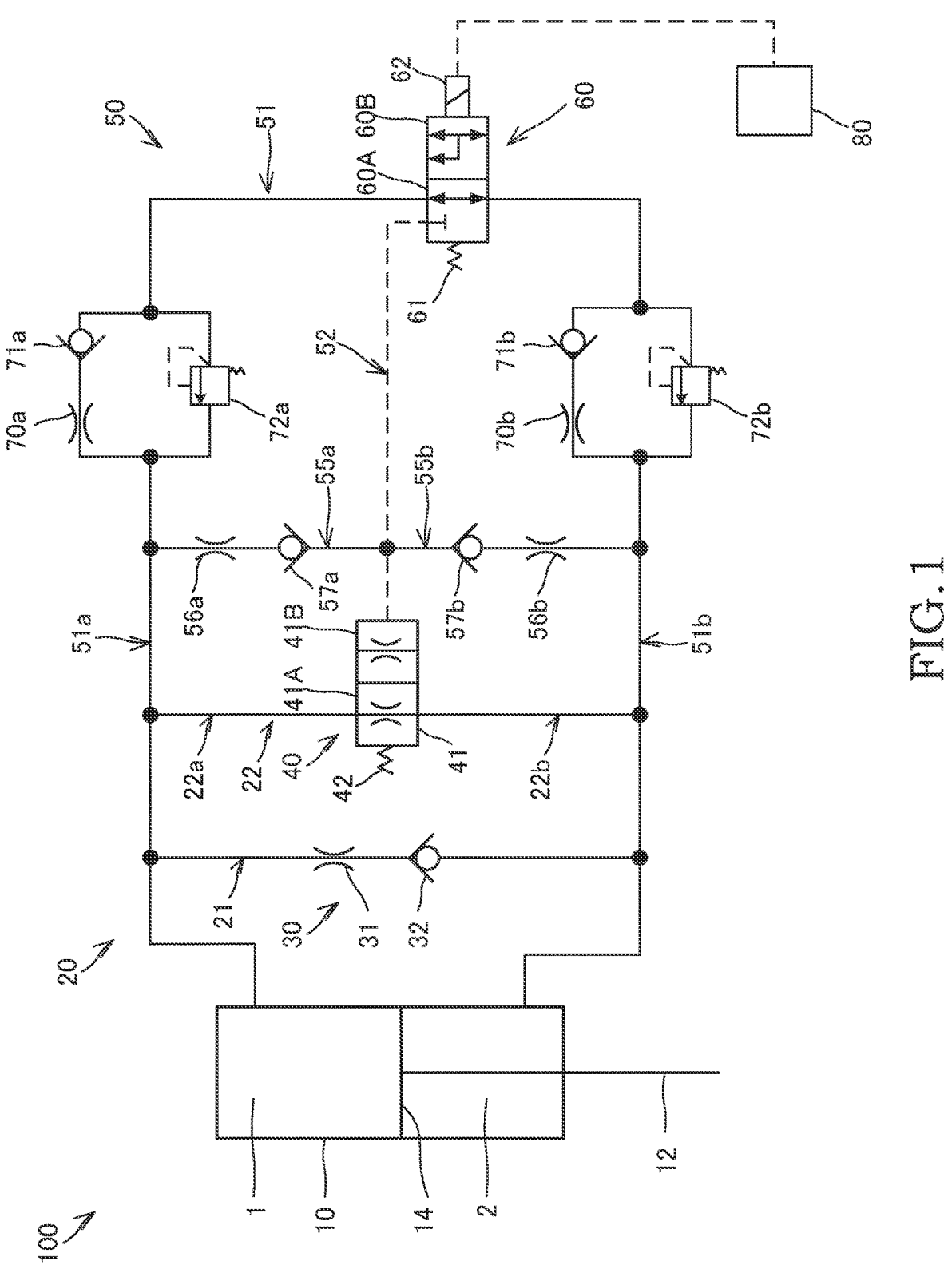
FIG. 1 is a configuration diagram of a shock absorber according to an embodiment of the present invention.

As shown in FIG. 1, the shock absorber 100 includes a tubular cylinder tube 10, a piston rod 12 that is inserted into the cylinder tube 10 so as to be freely movable back and forth and that extends outside the cylinder tube 10, and a piston 14 that is connected to a tip end of the piston rod 12 and that is freely slidably moved along an inner circumferential surface of the cylinder tube 10. In this embodiment, the shock absorber 100 is installed on the vehicle in an orientation at which the cylinder tube 10 is positioned at the upper side and the piston rod 12 is positioned at the lower side. Conversely, the shock absorber 100 may be installed on the vehicle in an orientation in which the cylinder tube 10 is positioned at the lower side and the piston rod 12 is positioned at the upper side. In addition, in this embodiment, although the shock absorber 100 is of a single-rod type in which the tip end of the piston rod 12 projects out to the outside of the cylinder tube 10, the shock absorber 100 may also be of a double rod type in which both tip ends of the piston rod 12 project out to the outside of the cylinder tube 10.

An interior of the cylinder tube 10 is partitioned by a piston 14 into a bottom-side chamber 1 and a rod side chamber 2. The bottom-side chamber 1 and the rod-side chamber 2 are respectively filled with working oil serving as working fluid. In addition, although not shown in the figures, in the bottom-side chamber 1, a gas for achieving a spring effect by utilizing a volume change in the cylinder tube 1 due to inward and outward movement of the piston rod 12 relative to the cylinder tube 10 is sealed together with the working oil. As described above, the shock absorber 100 is the fluid pressure dumper that has a function of an air-suspension that is capable of supporting the vehicle body by the spring effect utilizing the gas. In this case, even if a spring for supporting the vehicle body is not provided separately, it is possible to achieve generation of the damping force and support of the vehicle body by the shock absorber 100.

Note that, the configuration is not limited to those described above, and the gas may not be sealed in the cylinder tube 10. In addition, it may be possible to provide a free piston that is provided inside the bottom-side chamber 1 so as to be freely movable and that partitions the bottom-side chamber 1 into a liquid chamber, into which the working oil is filled, and a gas chamber, into which the gas is sealed. In this case, the piston 14 is configured so as to face the liquid chamber.

The shock absorber 100 is further provided with a damping unit 20 that generates the damping force by imparting resistance to a flow of the working oil between the rod-side chamber 2 and the bottom-side chamber 1.

The shock absorber 100 has, for example, a configuration of a so-called internal piping type in which respective configurations of the damping unit 20 and flow paths are provided inside respective parts (the cylinder tube 10, the piston 14, and the piston rod 12) forming the shock absorber 100. In the damping unit 20, only a part of the configurations and the flow paths may be provided inside components of the shock absorber 100, or alternatively, they may be provided entirely at the outside of the shock absorber 100 so that the shock absorber 100 has an external piping type configuration.

The damping unit 20 has a first fluid passage 21 and a second fluid passage 22 each serving as a fluid passage through which the bottom-side chamber 1 and the rod side chamber 2 are communicated with each other, a first resistance portion 30 that is provided in the first fluid passage 21 and that imparts the resistance to the flow of the working oil passing therethrough, and a second resistance portion 40 that is provided in the second fluid passage 22 and that imparts the resistance to the flow of the working oil.

The first resistance portion 30 imparts the resistance only to the flow of the working oil flowing from the bottom-side chamber 1 towards the rod side chamber 2. The first resistance portion 30 has a damping restrictor portion 31 that generates the damping force by imparting the resistance to the working oil passing therethrough and a check valve 32 that allows only the flow of the working oil flowing from the bottom-side chamber 1 towards the rod side chamber 2. In other words, in the first fluid passage 21, only the flow of the working oil flowing from the bottom-side chamber 1 towards the rod side chamber 2 is allowed, and the flow in the opposite direction is restricted. The damping restrictor portion 31 is, for example, a fixed orifice.

The second resistance portion 40 imparts the resistance to the flows of the working oil between the bottom-side chamber 1 and the rod side chamber 2 in both directions. In other words, in the second fluid passage 22, the flows of the working oil in both directions are allowed between the bottom-side chamber 1 and the rod side chamber 2.

The second resistance portion 40 has a damping valve 41, with which the resistance imparted to the passing flow of the working oil is changed in accordance with the position of the damping valve 41.

The damping valve 41 has a first restricting position 41A at which a predetermined resistance is imparted to the passing flow of the working oil and a second restricting position 41B at which the resistance is imparted to the passing flow of the working oil at a level different from that of the resistance imparted by the first restricting position 41A. In other words, the first restricting position 41A and the second restricting position 41B have different pressure loss characteristics for the passing flow of the working oil.

The damping valve 41 has a valve body (not shown) that switches the position, a spring 42 serving as a biasing member that biases the valve body, and a pilot pressure chamber (not shown) to which a pilot pressure is guided. In the damping valve 41, the valve body is biased by the spring 42 so as to be positioned at the first restricting position 41A. In the damping valve 41, as the pilot pressure is guided to the pilot pressure chamber, the valve body is moved by the pilot pressure against the biasing force exerted by the spring 42, and thereby, the damping valve 41 is switched to the second restricting position 41B. When the supply of the pilot pressure to the damping valve 41 is shut off, the damping valve 41 is switched to the first restricting position 41A by the biasing force exerted by the spring 42.

In the following, for the sake of convenience of description, in the second fluid passage 22, a portion through which the bottom-side chamber 1 is communicated with the damping valve 41 is referred to as "a bottom-side passage 22a", and a portion through which the rod side chamber 2 is communicated with the damping valve 41 is referred to as "a rod-side passage 22b".

The damping unit 20 further has a switching portion 50 for switching the positions of the damping valve 41.

The switching portion 50 has a bypass passage 51 that is connected to the second fluid passage 22 so as to bypass the damping valve 41 and a solenoid valve 60 that is provided in the bypass passage 51 and controls the supply of the pilot pressure to the damping valve 41.

When viewed along the flowing direction of the working oil, the bypass passage 51 is connected to the second fluid passage 22 between the damping valve 41 and the bottom-side chamber 1 and connected to the second fluid passage 22 between the rod side chamber 2 and the damping valve 41. In other words, the one end of the bypass passage 51 is connected to the bottom-side passage 22a of the second fluid passage 22 and the other end thereof is connected to the rod-side passage 22b. The bypass passage 51 moves a part of the working oil to be guided to the second fluid passage 22 between the bottom-side chamber 1 and the rod side chamber 2 without passing through the damping valve 41.

In the following, for the sake of convenience of description, in the bypass passage 51, a portion through which the bottom-side passage 22a of the second fluid passage 22 is communicated with the solenoid valve 60 is referred to as "a bottom-side bypass passage 51a", and a portion through which a rod-side passage 22B is communicated with the solenoid valve 60 is referred to as "a rod-side bypass passage 51b".

A pilot passage 52 that guides the pilot pressure to the damping valve 41 is connected to the solenoid valve 60. The solenoid valve 60 has a shut-off position 60A at which the supply of the pilot pressure to the damping valve 41 is shut off and a supply position 60B at which a part of the working oil in the bypass passage 51 is guided to the damping valve 41 as the pilot pressure via the pilot passage 52. The solenoid valve 60 is configured so as to open the bypass passage 51 without shutting it off at both of the shut-off position 60A and the supply position 60B.

Operation of the solenoid valve 60 is controlled by a electric signal input from a controller 80. The solenoid valve 60 has the valve body (not shown) that switches the positions, a spring 61 serving as the biasing member that biases the valve body, and a solenoid 62 that moves the valve body against the biasing force exerted by the spring 61 by being energized.

In the solenoid valve 60, the valve body is biased by the spring 61 so as to be positioned at the shut-off position 60A. When the solenoid 62 is exited by being energized, the valve body is moved against the biasing force exerted by the spring 61, and the solenoid valve 60 is switched to the supply position 60B. When the energization of the solenoid 62 is cutoff, the solenoid valve 60 is switched to the shut-off position 60A by the biasing force exerted by the spring 61.

A first circulating passage 55a that returns the pilot pressure that has been supplied to the damping valve 41 to the bottom-side passage 22a and a second circulating passage 55b that returns the pilot pressure that has been supplied to the damping valve 41 to the rod-side passage 22b are connected to the pilot passage 52.

The first circulating passage 55a is provided with a first circulation restrictor portion 56a that imparts the resistance to the passing flow of the working oil and a first circulating check valve 57a that only allows the flow of the working oil flowing from the pilot pressure chamber of the damping valve 41 towards the bottom-side passage 22a.

The second circulating passage 55b is provided with a second circulation restrictor portion 56b that imparts the resistance to the passing flow of the working oil and a second circulating check valve 57b that only allows the flow of the working oil flowing from the pilot pressure chamber of the damping valve 41 towards the rod-side passage 22b.

The bottom-side bypass passage 51a is provided with a bottom-side restrictor portion 70a that imparts the resistance to the passing flow of the working oil, a bottom-side check valve 71a that only allows the flow of the working oil flowing from the bottom-side chamber 1 towards the solenoid valve 60 via the bottom-side bypass passage 51a, and a bottom-side relief valve 72a that is opened when the pressure in the bypass passage 51 reaches a predetermined relief pressure and releases the pressure in the bypass passage 51 to the bottom-side chamber 1 via the bottom-side passage 22a.

The bottom-side restrictor portion 70a and the bottom-side check valve 71a are provided in series with each other, and the bottom-side relief valve 72a is provided in parallel with the bottom-side restrictor portion 70a and the bottom-side check valve 71a.

The rod-side bypass passage 51b is provided with a rod-side restrictor portion 70b that imparts the resistance to the passing flow of the working oil, a rod-side check valve 71b that only allows the flow of the working oil flowing from the rod side chamber 2 towards the solenoid valve 60 via the rod-side bypass passage 51b, and a rod-side relief valve 72b that is opened when the pressure in the bypass passage 51 reaches a predetermined relief pressure and releases the pressure in the bypass passage 51 to the rod side chamber 2 via the rod-side passage 22b.

The rod-side restrictor portion 70b and the rod-side check valve 71b are provided in series with each other, and the rod-side relief valve 72b is provided in parallel with the rod-side restrictor portion 70b and the rod-side check valve 71b.

The bottom-side restrictor portion 70a and the rod-side restrictor portion 70b are configured to respectively impart greater resistance to the flow of the working oil than the resistance imparted at the first restricting position 41A and the second restricting position 41B of the damping valve 41. With such a configuration, the amount of the working oil guided from the second fluid passage 22 to the bypass passage 51 is suppressed. In other words, the amount of the working oil guided from the second fluid passage 22 to the bypass passage 51 is smaller than the flowing amount of the working oil flowing through the second fluid passage 22 between the bottom-side chamber 1 and the rod side chamber 2. Thus, the flow of the working oil between the bottom-side chamber 1 and the rod side chamber 2 passes mainly through the first fluid passage 21 and the second fluid passage 22. Therefore, it is possible to sufficiently ensure the damping force by ensuring the flowing amount of the working oil to be guided to the damping valve 41.

The relief pressures of the bottom-side relief valve 72a and the rod-side relief valve 72b are set to a level that can sufficiently protect the solenoid valve 60. The relief pressures of the bottom-side relief valve 72a and the rod-side relief valve 72b are set to, for example, the same level with each other. The relief pressures of the bottom-side relief valve 72a and the rod-side relief valve 72b may be set to different levels from each other.

Next, operation of the shock absorber 100 will be described.

When the shock absorber 100 is contracted, along with the contraction of the bottom-side chamber 1, the pressure in the bottom-side chamber 1 is increased, and the working oil is discharged from the bottom-side chamber 1. A part of the working oil in the bottom-side chamber 1 passes the damping restrictor portion 31 of the first fluid passage 21 and is guided to the rod side chamber 2 by opening the check valve 32. The remaining of the working oil in the bottom-side chamber 1 is guided to the rod side chamber 2 by passing through the damping valve 41 of the second fluid passage 22. As described above, when the shock absorber 100 is contracted, the working oil in the bottom-side chamber 1 is guided to both of the first fluid passage 21 and the second fluid passage 22, and then guided to the rod side chamber 2 by passing through both of the damping restrictor portion 31 and the damping valve 41. Therefore, in the shock absorber 100, the damping force is generated correspondingly to an overall flow path resistance exerted by the damping restrictor portion 31 and the damping valve 41 together.

When the shock absorber 100 is extended, along with the extension of the rod side chamber 2, the pressure in the rod side chamber 2 is increased, and the working oil is discharged from the rod side chamber 2. The working oil in the rod side chamber 2 is guided to the bottom-side chamber 1 by passing through the damping valve 41.

On the other hand, because the check valve 32 is closed by the pressure increase in the rod side chamber 2, the working oil in the rod side chamber 2 is not guided to the bottom-side chamber 1 through the damping restrictor portion 31 of the first fluid passage 21. Thus, when the shock absorber 100 is extended, the damping force is generated correspondingly to the flow path resistance generated by the damping valve 41. Therefore, because the flow of the working oil from the bottom-side chamber 1 towards the rod side chamber 2 via the damping restrictor portion 31 is allowed during the contraction, correspondingly, the shock absorber 100 can easily generate greater damping force during the extension than during the contraction. With such a configuration, in a case in which the vehicle drives over a bump on a road surface, the shock absorber 100 is contracted in a relatively smooth manner, and thereafter, the shock absorber 100 generates large damping force during extension, and thereby, the vibration exerted from the road surface to the vehicle body is effectively damped.

Next, an operation of adjusting the damping characteristic by switching the positions of the damping valve 41 will be described. In the following, an case in which the shock absorber 100 is contracted will be mainly described as an example.

In order to switch the damping characteristic of the damping valve 41, the controller 80 switches the energization state and the energization cutoff state of the solenoid 62 of the solenoid valve 60. In a state in which the solenoid 62 is not energized, the solenoid valve 60 is positioned at the shut-off position 60A, and the pilot pressure is not supplied to the damping valve 41. Therefore, the damping valve 41 is positioned at the first restricting position 41A.

In a state in which the solenoid 62 is energized, the solenoid valve 60 is positioned at the supply position 60B, and the pressure in the bypass passage 51 is supplied to the damping valve 41 as the pilot pressure. As a result, the damping valve 41 is switched to the second restricting position 41B. As described above, in the state in which the solenoid 62 is energized, the damping valve 41 is positioned at the second restricting position 41B, and when the state in which the solenoid 62 is not energized, the damping valve 41 is positioned at the first restricting position 41A.

The pressure in the bypass passage 51 to be supplied to the damping valve 41 as the pilot pressure will be described. In this embodiment, the pilot pressure to be supplied from the bypass passage 51 to the damping valve 41 is controlled by the solenoid valve 60. Therefore, it is required to suppress excessive increase in the pressure in the bypass passage 51 to protect the solenoid valve 60.

In the shock absorber 100, for example, there is a case in which the pressure increase in the bottom-side chamber 1 is not relatively large and the pressure of the working oil discharged from the bottom-side chamber 1 also does not become relatively high (hereinafter also referred to as "a low-load state"), such as a case in which a contracting speed is relatively slow, a case in which a magnitude of the load is not high, or the like. In this case, the pressure of the working oil that has been discharged from the bottom-side chamber 1 and passed through the bottom-side restrictor portion 70a becomes lower than the pressure in the bypass passage 51. Thus, the bottom-side check valve 71a is closed, and the flow of the working oil flowing from the bottom-side chamber 1 towards the solenoid valve 60 is not caused.

In the low-load state as described above, as the solenoid 62 is energized and the solenoid valve 60 is switched to the supply position 60B, the residual pressure in the bypass passage 51 is guided to the damping valve 41 as the pilot pressure.

When the energization of the solenoid 62 is cutoff in the low-load state and the solenoid valve 60 is switched from the supply position 60B to the shut-off position 60A, the working oil in the pilot pressure chamber of the damping valve 41 is returned towards the rod side chamber 2, in which the pressure has been lowered due to the contraction. More specifically, the working oil in the pilot pressure chamber of the damping valve 41 opens the second circulating check valve 57b and is returned to the rod side chamber 2 by passing through the second circulation restrictor portion 56b. Thereby, because the pressure in the pilot pressure chamber is lowered, the damping valve 41 is switched from the second restricting position 41B to the first restricting position 41A by the biasing force exerted by the spring 42.

As described above, in the low-load state, as the residual pressure in the bypass passage 51 is supplied to or shut-off from the damping valve 41 as the pilot pressure, the positions of the damping valve 41 are switched.

On the other hand, for example, in a case in which the contracting speed of the shock absorber 100 is relatively fast, a case in which the load is high, or the like, the pressure of the working oil discharged from the bottom-side chamber 1 may be high, and the pressure of the working oil that has passed through the bottom-side restrictor portion 70a may become higher than the residual pressure in the bypass passage 51. In addition, even if the pressure of the working oil discharged from the bottom-side chamber 1 is not high, the pressure of the working oil that has passed through the bottom-side restrictor portion 70a may become higher than the residual pressure in the bypass passage 51 as the residual pressure in the bypass passage 51 is lowered. In the following, a state in which the pressure of the working oil that has passed through the bottom-side restrictor portion 70a becomes higher than the residual pressure in the bypass passage 51 is also referred to as "a high-load state".

In the high-load state as described above, because the pressure of the working oil that has passed through the bottom-side restrictor portion 70a is higher than the residual pressure in the bypass passage 51, the bottom-side check valve 71a is opened, and the pressure in the bottom-side chamber 1 is guided to the bypass passage 51.

Therefore, in the high-load state, as the solenoid 62 is energized and the solenoid valve 60 is switched to the supply position 60B, the pressure of the working oil guided from the bottom-side chamber 1 to the bypass passage 51 is guided to the damping valve 41 as the pilot pressure. From another point of view, the pressure in the bypass passage 51 is increased by the pressure of the working oil discharged from the bottom-side chamber 1, and the pressure in the bypass passage 51 that has been increased as described above is guided to the damping valve 41 as the pilot pressure. Thereby, the damping valve 41 is switched from the first restricting position 41A to the second restricting position 41B.

In a case in which the energization of the solenoid 62 is cutoff and the solenoid valve 60 is switched from the supply position 60B to the shut-off position 60A, similarly to the case in the low-load state, the working oil in the pilot pressure chamber of the damping valve 41 is returned towards the rod side chamber 2, in which the pressure has been lowered due to the contraction. As a result, the damping valve 41 is switched from the second restricting position 41B to the first restricting position 41A by the biasing force exerted by the spring 42.

As described above, in the high-load state, as the working oil in the bottom-side chamber 1 is guided to the bypass passage 51 by passing through the bottom-side restrictor portion 70a and is supplied to or shut-off from the damping valve 41 as the pilot pressure, the positions of the damping valve 41 are switched.

Regardless of the position of the solenoid valve 60, in the high-load state, when the pressure in the bypass passage 51 reaches the relief pressure as the working oil is guided from the bottom-side chamber 1 to the bypass passage 51, the rod-side relief valve 72b is opened. As a result, the pressure in the bypass passage 51 can be released to the rod side chamber 2, in which the pressure has been lowered due to the contraction, and so, it is possible to suppress the excessive increase in the pressure in the bypass passage 51 to protect the solenoid valve 60. Note that, at this time, because the pressure in the bottom-side chamber 1 has been increased to a high pressure, the bottom-side relief valve 72a is in a closed state.

As described above, in both of the low-load state and the high-load state, it is possible to guide the pressure in the bypass passage 51 to the damping valve 41 as the pilot pressure by controlling the energization state and the energization cutoff state of the solenoid 62 of the solenoid valve 60. As a result, it is possible to perform the adjustment of the damping characteristic by switching the positions of the damping valve 41. In addition, even under the high load, because the pressure in the bypass passage 51 is kept equal to or lower than the relief pressure of the rod-side relief valve 72b, it is possible to supply the pilot pressure to the damping valve 41 while protecting the solenoid valve 60. In addition, even in a case in which the residual pressure in the bypass passage 51 is lowered, because the pressure of the working oil is guided from the bottom-side chamber 1 to recover the pressure, it is possible to prevent a situation in which the pilot pressure cannot be supplied to the damping valve 41.

Note that, a detailed description of the action during the extension will be omitted because the function obtained by the configuration on the bottom side and the function obtained by the configuration on the rod side are simply interchanged compared with the action during the contraction.

In other words, during the contraction, the bottom-side chamber 1 functions as "the first pressure chamber", and the rod side chamber 2 functions as "the second pressure chamber". In addition, the bottom-side restrictor portion 70a functions as "a first restrictor portion", the rod-side restrictor portion 70b functions as "a second restrictor portion", the rod-side relief valve 72b functions as "a first relief valve", the bottom-side relief valve 72a functions as "a second relief valve", the bottom-side check valve 71a functions as "a first check valve", and the rod-side check valve 71b functions as "a second check valve".

During the extension, contrary to the contraction, the rod side chamber 2 functions as "a first pressure chamber", and the bottom-side chamber 1 functions as "a second pressure chamber". In addition, the rod-side restrictor portion 70b functions as "the first restrictor portion", the bottom-side restrictor portion 70a functions as "the second restrictor portion", the bottom-side relief valve 72a functions as "the first relief valve", the rod-side relief valve 72b functions as "the second relief valve", the rod-side check valve 71b functions as "the first check valve", and the bottom-side check valve 71a functions as "the second check valve".

According to the above-described embodiment, following operational advantages are afforded.

In the shock absorber 100, the resistance is imparted by the bottom-side restrictor portion 70a or the rod-side restrictor portion 70b to the flow of the working oil flowing from the second fluid passage 22 towards the solenoid valve 60. Therefore, the pressure increase in the bypass passage 51 can be suppressed, and application of high pressure to the solenoid valve 60 can be suppressed. In addition, as the pressure in the bypass passage 51 is increased, the rod-side relief valve 72b is opened, and thereby, the pressure in the bypass passage 51 is released to the rod side chamber 2 or the bottom-side chamber 1, in which the pressure has been reduced. Therefore, the application of high pressure to the solenoid valve 60 provided in the bypass passage 51 is suppressed. Thus, while protecting the solenoid valve 60, it is possible to adjust the damping characteristic of the shock absorber 100 by controlling the solenoid valve 60 without performing the changing operation of the parts, etc.

In addition, the shock absorber 100 has the configuration in which the damping characteristic of the shock absorber 100 is adjusted by switching the positions of the damping valve 41 by the solenoid valve 60. Therefore, for example, it is possible to change the damping characteristic at any given timing in accordance with a driving condition of the vehicle, such as a stroke region of the shock absorber 100, steering operation of the vehicle, a road surface condition, and so forth. Thus, a convenience of the shock absorber 100 is improved.

Next, a modification of this embodiment will be described. The modifications described below also fall within the scope of the present invention. It may also be possible to combine the following modifications with the respective configurations in the above-described embodiment, and it may also be possible to combine the following modifications with each other.

In the above-mentioned embodiment, the first resistance portion 30 has the damping restrictor portion 31 with a fixed flow path resistance, and the second resistance portion 40 has the damping valve 41 with variable flow path resistances (the pressure loss characteristic). In contrast, the first resistance portion 30 may be provided with, instead of the damping restrictor portion 31, the damping valve 41 that is similar to the damping valve 41 of the second resistance portion 40. In this case, the first fluid passage 21 also functions as "the fluid passage". In addition, in this case, the second resistance portion 40 may also have, similarly to the above-mentioned embodiment, the damping valve 41, or may also have the damping restrictor portion 31 with the fixed flow path resistance instead of the damping valve 41.

In addition, in the above-mentioned embodiment, the damping valve 41 has the configuration in which the damping valve 41 has two positions such that the damping characteristic can be switched in two stages. In contrast, the damping valve 41 may have three or more positions such that the damping characteristic can be switched in three or more stages. In this case, the solenoid valve 60 may be configured so as to be positioned correspondingly to the damping valve 41.

In the following, a first modification will be described with reference to FIG. 2.

In the first modification, the first resistance portion 30 and the second resistance portion 40 each has a damping valve 141. The damping valve 141 of the first resistance portion 30 and the damping valve 141 of the second resistance portion 40 have the same configuration. Each of the damping valves 141 has the first restricting position 41A, the second restricting position 41B, and a third restricting position 41C. In a state in which the pilot pressure is not supplied, the damping valves 141 are respectively positioned at the second restricting positions 41B by the biasing forces exerted by a pair of springs 42a and 42b. When the pilot pressure is supplied to the one of the pilot pressure chambers (not shown), the damping valve 141 is switched to the first restricting position 41A, and when the pilot pressure is supplied to the other of the pilot pressure chambers (not shown), the damping valve 141 is switched to the third restricting position 41C.

The bypass passage 51 is provided with a solenoid valve 160 that switches the damping valve 41 of the first resistance portion 30 and the solenoid valve 160 that switches the damping valve 41 of the second resistance portion 40. The two solenoid valves 160 provided in the bypass passage 51 have the same configuration with each other. The solenoid valves 160 each has the shut-off position 60A that shuts off the supply of the pilot pressure to the corresponding damping valve 141, the first supply position 60B that supplies the pilot pressure to the one of the pilot pressure chambers of the damping valve 41, and a second supply position 60C that supplies the pilot pressure to the other of the pilot pressure chambers of the damping valve 41. In a state in which a pair of solenoids 62a and 62b are not exited, the solenoid valves 160 are respectively positioned at the shut-off positions 60A by the biasing forces exerted by a pair of springs 61a and 61*b*. In addition, for each of the solenoid valves 160, the first supply position 60B is achieved when the one solenoid 62*a* is exited, and the second supply position 60C is achieved when the other solenoid 62*b* is exited.

According to the first modification description above, because it is possible to increase the variation for the adjustment of the damping characteristic, it is possible to generate suitable damping force for more various situations. In addition, because the first resistance portion 30 has the damping valve 41, it is possible to individually adjust only the damping characteristic for during the contraction of the shock absorber 100.

Figure 2:
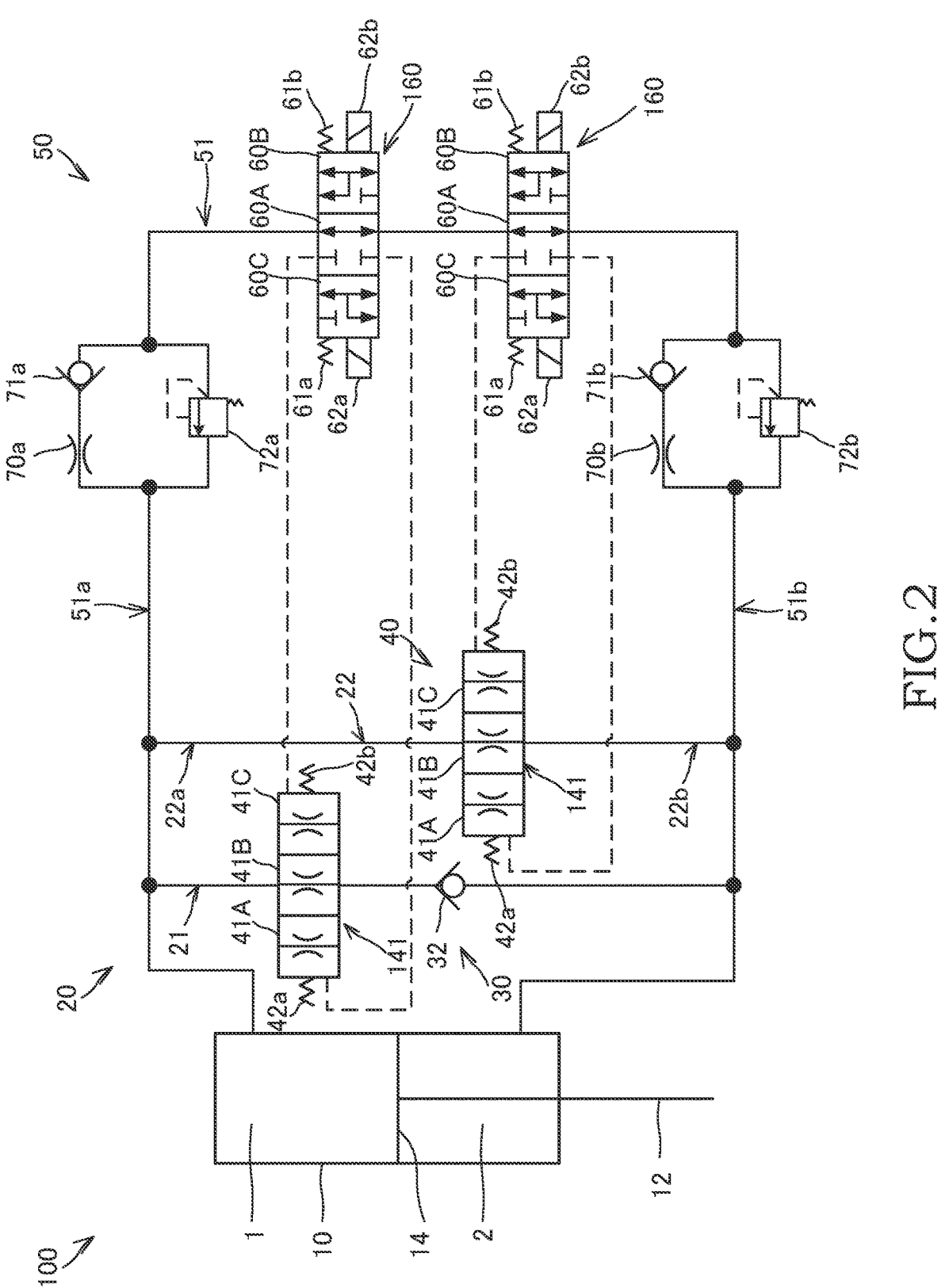
FIG. 2 is a configuration diagram showing a first modification of the shock absorber according to the embodiment of the present invention.

In FIG. 2, for the sake of convenience of description, although the illustration of the first circulating passage 55*a* and the second circulating passage 55*b* is omitted, also in the first modification, similarly to the above-mentioned embodiment, it is desirable to provide a circulating passage that releases the working oil at the respective pilot pressures of the damping valve 41 to the bottom-side chamber 1 or the rod side chamber 2.

Next, a second modification will be described with reference to FIG. 3.

Figure 3:
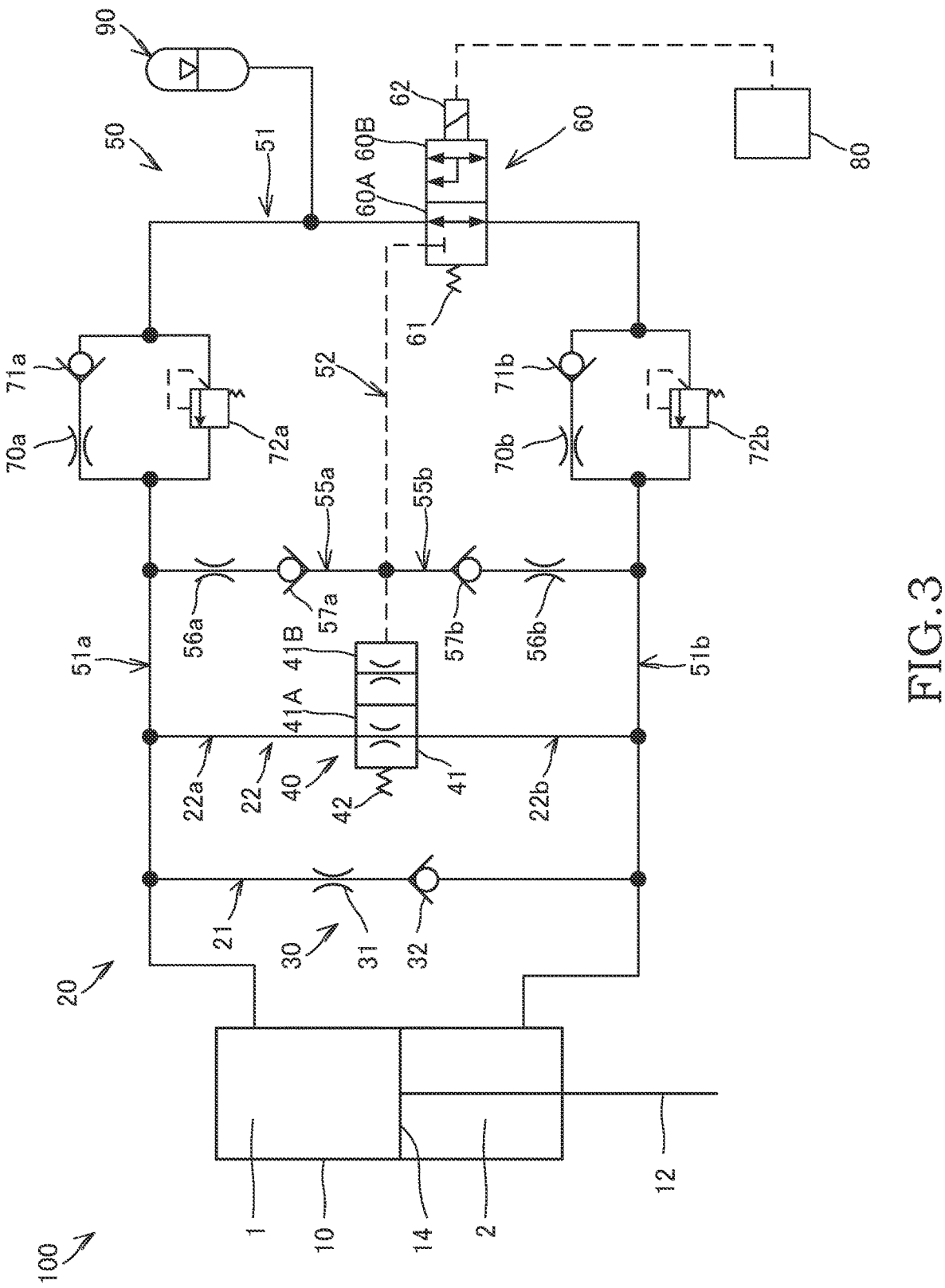
FIG. 3 is a configuration diagram showing a second modification of the shock absorber according to the embodiment of the present invention.

As shown in FIG. 3, in the second modification, the switching portion 50 further has an accumulator 90 that accumulates and stores the working oil of the bypass passage 51. According to the second modification described above, because a sudden fluctuation of the pressure in the bypass passage 51 is suppressed by the accumulator 90, the solenoid valve 60 is further protected. In addition, because the pressure can be compensated by the accumulator 90 even if the pressure in the bypass passage 51 is lowered, it is possible to ensure the pilot pressure to the damping valve 41.

Next, other modifications will be described.

The configurations of the first resistance portion 30 and/or the second resistance portion 40 are not limited to those having the single damping valve 41, and a plurality of damping valves 41 may also be provided. In other words, the first fluid passage 21 and/or the second fluid passage 22 may be provided with two or more damping valves 41 in series. By providing the plurality of damping valves 41 in the first resistance portion 30 and/or the second resistance portion 40, a variety of damping characteristics can be achieved depending on the combinations of the respective positions of the damping valves 41.

In addition, in the above-mentioned embodiment, although the switching portion 50 is provided with the first circulating passage 55*a* and the second circulating passage 55*b*, at least one of them may be provided in order to release the working oil at the pilot pressure.

In addition, in the above-mentioned embodiment, during the contraction, the working oil in the bottom-side chamber 1 is guided to the rod side chamber 2 by passing through both of the first fluid passage 21 and the second fluid passage 22, and during the extension, the working oil in the rod side chamber 2 is guided to the bottom-side chamber 1 by passing through the second fluid passage 22 only. In contrast, the check valve 32 of the first fluid passage 21 may be eliminated, and the second fluid passage 22 may be provided with a check valve that only allows the flow of the working oil flowing from the rod side chamber 2 towards the bottom-side chamber 1.

In the following, the configurations, operations, and effects of the respective embodiments of the present invention will be collectively described.

The shock absorber 100 includes: the cylinder tube 10; the piston rod 12 inserted into the cylinder tube 10 so as to be freely movable back and forth; the piston 14 connected to the piston rod 12, the piston 14 being configured to partition an interior of the cylinder tube into the first pressure chamber (the bottom-side chamber 1, the rod side chamber 2) and the second pressure chamber (the rod side chamber 2, the bottom-side chamber 1); and the damping unit 20 configured to generate the damping force by imparting the resistance to the flow of the working oil between the first pressure chamber and the second pressure chamber, wherein the damping unit 20 has: the fluid passage (the second fluid passage 22, the first fluid passage 21) configured to guide the working oil from the first pressure chamber towards the second pressure chamber; the damping valve 41 provided in the fluid passage, the damping valve 41 being configured to impart variable resistance to the flow of the working oil passing therethrough depending on the positions; the bypass passage 51 connected to the fluid passage so as to bypass the damping valve 41; the solenoid valve 60 provided in the bypass passage 51, the solenoid valve 60 being configured to control the flow of the working oil in the bypass passage 51 guided to the damping valve 41 as the pilot pressure for switching the positions of the damping valve 41; the first restrictor portion (the bottom-side restrictor portion 70*a*, the rod-side restrictor portion 70*b*) configured to impart the resistance to the flow of the working oil guided to the solenoid valve 60 from the fluid passage; and the relief valve (the rod-side relief valve 72*b*, the bottom-side relief valve 72*a*) configured to open when the pressure in the bypass passage 51 reaches a predetermined relief pressure to release the pressure in the bypass passage 51 to the second pressure chamber through the fluid passage.

With this configuration, because the resistance is imparted by the restrictor portion to the flow of the working fluid flowing from the fluid passage towards the solenoid valve 60, even if the high-pressure working fluid flows from the first pressure chamber towards the second pressure chamber, it is possible to suppress the application of the high pressure to the solenoid valve 60. In addition, as the pressure in the bypass passage 51 is increased, the pressure is released to a connection passage from the bypass passage 51 by the relief valve, the application of the high pressure to the solenoid valve 60 provided in the bypass passage 51 is suppressed. Therefore, according to the shock absorber 100, it is possible to adjust the damping characteristic while protecting the solenoid valve 60 in the damping unit 20 of the fluid pressure dumper.

In addition, in the shock absorber 100, the fluid passage also allows the flow of the working fluid flowing from the second pressure chamber towards the first pressure chamber, and wherein the damping unit 20 has: the second restrictor portion (the rod-side restrictor portion 70*b*, the bottom-side restrictor portion 70*a*) provided in the bypass passage 51 so as to be in parallel with the first relief valve, the second restrictor portion being configured to impart the resistance to the flow of the working fluid guided to the solenoid valve 60 from the second pressure chamber through the fluid passage; the second relief valve (the bottom-side relief valve 72*a*, the rod-side relief valve 72*b*) provided in the bypass passage 51 so as to be in parallel with the first restrictor portion, the second relief valve being configured to open when the pressure in the bypass passage 51 reaches a predetermined relief pressure to release the pressure in the bypass passage 51 to the fluid passage extending from the damping valve 41 towards the first pressure chamber; the first check valve (the bottom-side check valve 71*a*, the rod-side check valve 71*b*) provided in the bypass passage 51 between the first restrictor portion and the solenoid valve 60, the first check valve being configured to allow only the flow of the working fluid flowing from the first restrictor portion towards the solenoid valve 60; and the second check valve (the rod-side check valve 71*b*, the bottom-side check valve 71*a*) provided in the bypass passage 51 between the second restrictor portion and the solenoid valve 60, the second check valve being configured to allow only the flow of the working fluid flowing from the second restrictor portion towards the solenoid valve 60.

With this configuration, because the damping force can be generated by the damping valve 41 for both of the extension and the contraction of the shock absorber 100, it is possible to adjust the damping characteristic for both of the extension and the contraction.

In addition, in the shock absorber 100, the damping unit 20 has: the circulating passage (the first circulating passage 55*a*, the second circulating passage 55*b*) configured to return the pilot pressure supplied to the damping valve 41 to the fluid passage; and the circulation restrictor portion (the first circulation restrictor portion 56*a*, the second circulation restrictor portion 56*b*) provided in the circulating passage, the circulation restrictor portion being configured to impart the resistance to the flow of the working fluid passing therethrough.

With this configuration, because the sudden decrease in the pilot pressure is suppressed by the circulation restrictor portion, the damping valve 41 is prevented from being switched suddenly. As a result, it is possible to stabilize the damping force generated by the shock absorber 100.

In addition, in the shock absorber 100, the damping unit 20 further has the accumulator 90 connected to the bypass passage 51, the accumulator 90 being configured to accumulate and store the working oil.

With this configuration, because the pressure can be compensated by the accumulator 90 even if the pressure in the bypass passage 51 is lowered, it is possible to ensure the pilot pressure for the damping valve 41.

In addition, in the shock absorber 100, the first restrictor portion is configured to impart the greater resistance to the flow of the working fluid than the damping valve.

With this configuration, the flowing amount of the working oil guided from the fluid passage to the bypass passage 51 is suppressed. Therefore, the flow of the working oil guided from the first pressure chamber to the second pressure chamber flows mainly through the fluid passage, and so, it is possible to sufficiently ensure the damping force by ensuring the flowing amount of the working oil to be guided to the damping valve 41.

Embodiments of this invention were described above, but the above embodiments are merely examples of applications of this invention, and the technical scope of this invention is not limited to the specific constitutions of the above embodiments.

This application claims priority based on Japanese Patent Application No. 2021-49216 filed with the Japan Patent Office on Mar. 23, 2021, the entire contents of which are incorporated into this specification.

The invention claimed is:

1. A fluid pressure dumper comprising:

a cylinder tube;

a piston rod inserted into the cylinder tube so as to be freely movable into and out of the cylinder tube;

a piston connected to the piston rod, the piston being configured to partition an interior of the cylinder tube into a first pressure chamber and a second pressure chamber; and a damping unit configured to generate damping force by imparting resistance to a flow of working fluid between the first pressure chamber and the second pressure chamber, wherein the damping unit has:

a fluid passage configured to guide the working fluid flowing from the first pressure chamber towards the second pressure chamber;

a damping valve provided in the fluid passage, the damping valve being configured to impart variable resistance to the flow of the working fluid passing therethrough depending on positions;

a bypass passage connected to the fluid passage so as to bypass the damping valve;

a solenoid valve provided in the bypass passage, the solenoid valve being configured to guide a part of the working fluid in the bypass passage to the damping valve as a pilot pressure;

a first restrictor portion configured to impart resistance to the flow of the working fluid guided to the solenoid valve from the first pressure chamber through the bypass passage; and a first relief valve configured to open when a pressure in the bypass passage reaches a predetermined relief pressure to release the pressure in the bypass passage to the second pressure chamber through the fluid passage.

2. The fluid pressure damper according to claim 1, wherein the fluid passage also allows the flow of the working fluid flowing from the second pressure chamber towards the first pressure chamber, and wherein the damping unit has:

a second restrictor portion provided in the bypass passage so as to be in parallel with the first relief valve, the second restrictor portion being configured to impart resistance to the flow of the working fluid guided to the solenoid valve from the second pressure chamber through the fluid passage;

a second relief valve provided in the bypass passage so as to be in parallel with the first restrictor portion, the second relief valve being configured to open when a pressure in the bypass passage reaches a predetermined relief pressure to release the pressure in the bypass passage to the fluid passage extending from the damping valve towards the first pressure chamber;

a first check valve provided in the bypass passage between the first restrictor portion and the solenoid valve, the first check valve being configured to allow only the flow of the working fluid flowing from the first restrictor portion towards the solenoid valve; and a second check valve provided in the bypass passage between the second restrictor portion and the solenoid valve, the second check valve being configured to allow only the flow of the working fluid flowing from the second restrictor portion towards the solenoid valve.

3. The fluid pressure damper according to claim 1, wherein the damping unit further has:

a circulating passage configured to return the pilot pressure supplied to the damping valve to the fluid passage; and a circulation restrictor portion provided in the circulating passage, the circulation restrictor portion being configured to impart resistance to the flow of the working fluid passing therethrough.

4. The fluid pressure damper according to claim 1, wherein the damping unit further has an accumulator connected to the bypass passage, the accumulator being configured to accumulate and store the working fluid.

5. The fluid pressure damper according to claim 1, wherein the first restrictor portion is configured to impart greater resistance to the flow of the working fluid than the damping valve.

\* \* \* \* \*